United States Patent [19]
Patel et al.

[11] Patent Number: 5,879,446
[45] Date of Patent: Mar. 9, 1999

[54] GYPSUM WALLBOARD, AND METHOD OF MAKING SAME

[75] Inventors: Jashbhai M. Patel, Amherst; Ronald S. Finkelstein, East Amherst, both of N.Y.

[73] Assignee: National Gypsum Company, Charlotte, N.C.

[21] Appl. No.: 137,766

[22] Filed: Aug. 21, 1998

[51] Int. Cl.$^6$ ..................................................... C04B 11/00
[52] U.S. Cl. ........................ 106/781; 106/772; 106/778; 106/779; 106/780; 106/783; 106/785; 106/787; 106/802; 106/805; 106/809; 106/823; 156/39; 52/443; 428/703
[58] Field of Search .................................... 106/772, 778, 106/779, 780, 781, 783, 680, 802, 804, 805, 809, 785, 787, 820, 823; 156/39; 52/443; 428/703

[56] References Cited

U.S. PATENT DOCUMENTS

| | | | |
|---|---|---|---|
| 2,856,304 | 10/1958 | Kirk | 106/661 |
| 4,059,456 | 11/1977 | Derooy et al. | 106/779 |
| 4,169,747 | 10/1979 | De Rooy et al. | 156/39 |
| 4,184,887 | 1/1980 | Lange et al. | 106/781 |
| 4,293,344 | 10/1981 | Joseph | 524/5 |
| 5,151,130 | 9/1992 | Croft et al. | 106/778 |
| 5,286,412 | 2/1994 | Northey et al. | 252/352 |
| 5,653,797 | 8/1997 | Patel | 106/781 |

FOREIGN PATENT DOCUMENTS

| | | | |
|---|---|---|---|
| 26 31 031 | 1/1977 | Germany | 106/781 |

OTHER PUBLICATIONS

U.S. Patent and Trademark Office File History of U.S. Patent No. 4,157,254, Kennedy–Skipton, issued Jun. 5, 1979.
Colloids, Inc., Material Safety Data Sheet, pp. 1–2, Oct. 1, 1987.
Colloid 230 Product Sheet (No Date).
Technical Bulletin, "Coatings, Inks, Adhesives, and Construction Technology" (undated).
Rhone–Poulenc Specialty Chemicals Division, Material Safety Data Sheet, Colloid 231, pp. 1–3 (undated).
Delta Industries Incorporated, Material Safety Data Sheet, Aluminum Sulfate, Solution, Jan. 1, 1994, pp. 1–6.
Lignotech USA, Inc., Material Safety Data Sheet, D–1510 Liquid, Apr. 10, 1998, pp. 1–2.
Lignotech USA, Inc., Material Safety Data Sheet, D–1511 Liquid, Feb. 4, 1998, pp. 1–2.
Lignotech USA, Inc., Material Safety Data Sheet, D–1536 Liquid, May 8, 1998, pp. 1–2.
Kirk–Othmer Encyclopedia of Chemical Technology, vol. 4, pp. 618–624 (Fourth Edition 1992).
Kirk–Othmer Encyclopedia of Chemical Technology, vol. 15, pp. 268–269, 280–287 (Fourth Edition 1992).
Kirk–Othmer Encyclopedia of Chemical Technology, vol. 23, pp. 166–170, 204–206, 491–500 (Fourth Edition 1992).
Kirk–Othmer Encyclopedia of Chemical Technology, vol. 21, pp. 621–624 (Second Edition 1970).
"The Gypsum Industry and Flue Gas Desulfurization (FGD) Gypsum Utilization: A Utility Guide," New York State Electric & Gas Corp. and ORTECH, pp. 3–38 (1994).
Water Reducing Chemical Admixtures, V. Dodson, *Concrete Admixtures*, Chapter 3, pp. 39–71 (1990).
Hawley's Condensed Chemical Dictionary, pp. 699–700 (Eleventh Edition 1987).

*Primary Examiner*—Anthony Green
*Attorney, Agent, or Firm*—Marshall, O'Toole, Gerstein, Murray & Borun

[57] ABSTRACT

A method of preparation of gypsum wallboard, as well as a core composition suitable for use therein, are disclosed. The core composition includes a slurry of calcium sulfate hemihydrate (stucco), water, and calcium aluminum lignosulfonate and/or aluminum lignosulfonate.

20 Claims, No Drawings

GYPSUM WALLBOARD, AND METHOD OF MAKING SAME

BACKGROUND OF THE INVENTION

1. Field of the Invention

The present invention relates generally to gypsum containing materials, and is also directed to improved methods for producing gypsum board and related materials.

2. Description of Related Technology

Today one of the most common manners of constructing walls and barriers includes the use of inorganic wallboard panels or sheets, such as gypsum wallboard, sometimes referred to as "wallboard," "drywall," or "plasterboard." Wallboard can be formulated for interior, exterior, and wet area (such as bathroom) applications. The use of wallboard, as opposed to conventional wet plaster methods, is often desirable because the installation of wallboard can be less costly and faster than installation of conventional plaster walls.

Walls and ceilings made with gypsum wallboard panels are conventionally constructed by securing, e.g., with nails or screws, the wallboard panels to structural members, for example vertically and horizontally oriented pieces of steel or wood such as "studs." Because wallboard is typically supplied in standard-sized sheets or panels, when forming a wall from the sheets or panels, there will generally be a number of joints between adjacent sheets. In most wallboard construction, these joints are filled and coated with wallboard tape and an adhesive material called joint compound so that the wall will have a monolithic finish similar to that obtained with conventional wet plaster methods. Various joint compounds are described in U.S. Pat. No. 5,653,797, assigned to the assignee of the present application, the disclosure of which is hereby incorporated herein by reference.

Generally, wallboard is conventionally produced by enclosing a core containing an aqueous slurry of calcium sulfate hemihydrate (e.g., calcined gypsum) between two large sheets of board cover paper. Gypsum wallboard is typically manufactured commercially by processes that are capable of operation under continuous high speed conditions, wherein the aqueous slurry of calcined gypsum and other ingredients are continuously deposited to form a core between two continuously-supplied moving sheets of cover paper. Various types of cover paper are known in the art.

The calcined gypsum forming the core between the two cover sheets is then allowed to set (react with water from the aqueous slurry). The continuously-produced board may then be cut into panels of a desired length (for example, eight feet). The formed board contains an excess of water because more water is required for working properties during gypsum slurry preparation than is necessary for hydration of the gypsum. The boards are then passed through a drying kiln in which excess water is removed and the gypsum is brought to a final dry state. After the core has set and is dried, the sandwich becomes a strong, rigid, fire-resistant building material called gypsum drywall.

Other methods for the production of gypsum wallboard are described, for example, in the Kirk-Othmer Encyclopedia of Chemical Technology, Vol. 21, pages 621–24 (Second Edition 1970) and Vol. 4, pages 618–19 (Fourth Edition 1992), the disclosures of which are hereby incorporated herein by reference.

A major ingredient of the gypsum wallboard core is calcium sulfate hemihydrate, commonly referred to as "stucco" or "Plaster of Paris." Stucco is commonly manufactured by drying, grinding, and calcining natural gypsum rock. The drying step of stucco manufacture includes passing crude gypsum rock through a rotary kiln to remove any free moisture accumulated in the rock from rain or snow, for example. The dried rock is then passed through a roller mill (a type of pulverizer), wherein the rock is ground to a desired fineness. The dried, ground gypsum can be referred to as "land plaster."

The calcination step is performed by heating the ground gypsum rock, and is described by the following chemical equation:

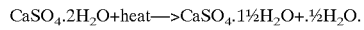

This chemical equation shows that calcium sulfate dihydrate plus heat yields calcium sulfate hemihydrate (stucco) plus water vapor. This process is conducted in a "calciner," of which there are several types known in the art. Various methods of producing calcium sulfate hemihydrate are known in the art.

Uncalcined calcium sulfate (the land plaster) is the "stable" form of gypsum. However, calcined gypsum, or stucco, has the valuable property of being chemically reactive with water, and will "set" rather quickly when the two are mixed together. This setting reaction is a reversal of the above-described chemical reaction performed during the calcination step. The reaction proceeds according to the following equation:

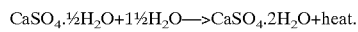

In this reaction, the calcium sulfate hemihydrate is rehydrated to its dihydrate state over a fairly short period of time. The actual time required for this setting reaction is generally dependent upon the type of calciner employed and the type of gypsum rock that is used, and can be controlled within certain limits by the use of additives such as accelerators and retarders.

In the hydration reaction, hemihydrate gypsum is mixed with water until a suspension is formed that is fluid and workable. The hemihydrate gypsum dissolves until it forms a saturated solution. This saturated solution of hemihydrate is supersaturated with respect to dihydrate gypsum, and so the latter crystallizes out of the solution at suitable nucleation sites. Finally, as the dihydrate gypsum precipitates, the solution is no longer saturated with hemihydrate gypsum, so the hemihydrate gypsum continues to dissolve. Thus the process continues to consume the hemihydrate gypsum. The reaction can be followed by measuring the heat evolved. Initially there is very little reaction and no rise in temperature. This time is referred to as the induction period. As the amount of dihydrate gypsum increases, the mass thickness increases and the material hardens (sets).

In order to facilitate the above reaction and/or provide beneficial properties to the final product, various additives may also be included in the core slurry. For example, starch, set accelerators and/or set retarders, preservatives, and fiberglass may be included.

As described above, the setting reaction for gypsum involves the reaction of calcium sulfate hemihydrate with water to form calcium sulfate dihydrate. The theoretical (stoichiometric) water content of the slurry required for the reaction of calcium sulfate hemihydrate is about 18.7 weight percent. However, a large amount of water is generally required to provide sufficient fluidity of the calcined gypsum slurry in order to obtain proper flow of the gypsum slurry in the manufacturing process. The amount of water required to provide proper fluidity depends upon various factors, such as the type of stucco, particle size distribution, the various phases of gypsum in the stucco, source, and the levels of above-described additives conventionally used in minor amounts.

Alpha-type stucco generally requires water usage of about 34 to about 45 cubic centimeters per 100 grams of calcined gypsum in order to form a readily pourable and flowable gypsum slurry. Beta-type stucco, on the other hand, typically has a water requirement of about 65 to about 75 cubic centimeters per 100 grams of calcined gypsum.

"Water reducing" additives may be included in order to improve the fluidity of the above-described gypsum slurry, while allowing use of reduced levels of water. Reduction in water usage brings reduced costs in the form of reduced water and energy demands, as less water will have to be removed during the drying step(s). Reduction of water usage also provides environmental benefits.

Various commercially-available fluidity-enhancing and/or water-reducing agents are known in the art for various applications. Typically the dispersing agent used in gypsum board manufacturing processes are calcium lignosulfonate, ammonium lignosulfonate, sodium lignosulfonate, and naphthalene sulfonate. Calcium lignosulfonate, sodium lignosulfonate, and ammonium lignosulfonate are believed to provide the ability to use reduced water levels, but they have the severe disadvantage of inhibiting the set of gypsum in the hydration reaction discussed above. Sodium lignosulfonate provides a weak paper-to-core interface in wallboard products. Ammonium lignosulfonate also has an objectionable odor due to the release of ammonia gas during the manufacturing process. The use of naphthalene sulfonate is limited, for example, due to its high cost. The use of condensation products of naphthalene sulfonic acid and formaldehyde is also known. See also U.S. Pat. No. 4,184,887, the disclosure of which is hereby incorporated herein by reference.

The use of the following additives in one or more applications is also known: anionic dispersing agents (such as alkylaryl sulfonates and lignin sulfonates) and higher molecular weight anionic condensation products (such as melamine formaldehyde modified with sulfite, as well as naphthalene sulfonate).

Water reducing agents are described in "The Gypsum Industry and Flue Gas Desulfurization (FGD) Gypsum Utilization: A Utility Guide," New York State Electric & Gas Corp. and ORTECH, pp. 3–38 (1994), the disclosure of which is hereby incorporated herein by reference.

The use of water reducing agents in another art, i.e., concrete, is described, for example, in "Water Reducing Chemical Admixtures," V. Dodson, *Concrete Admixtures*, Chapter 3, pp. 39–71 (1990), the disclosure of which is hereby incorporated herein by reference.

It would therefore be advantageous to provide a gypsum wallboard manufacturing process using a fluidity-enhancing additive that does not produce the set retarding effect suffered by some known manufacturing processes. Such wallboard also should be able to be manufactured through the use of conventional high-speed manufacturing apparatus, and not suffer from high cost or other negative side-effects such as detriment to long-term product performance.

SUMMARY OF THE INVENTION

It is an object of the invention to overcome one or more of the problems described above.

Accordingly, the invention provides compositions including a lignosulfonate salt such as calcium aluminum lignosulfonate or aluminum lignosulfonate for reducing the water requirements of a gypsum slurry.

According to one feature of the invention, calcium sulfate hemihydrate, water, and a property-enhancing additive including a lignosulfonate salt are combined to produce a gypsum core composition in the form of a slurry. The core composition is deposited between two paper cover sheets and allowed to set to produce a wallboard product.

Other objects and advantages of the invention will be apparent to those skilled in the art from the following detailed description, taken in conjunction with the appended claims.

DETAILED DESCRIPTION OF PREFERRED EMBODIMENTS

According to the invention, there are provided building material compositions useful in the production of gypsum wallboard. The invention further provides a method of producing gypsum wallboard wherein a property-enhancing agent including a lignosulfonate salt is incorporated into a gypsum core composition slurry.

According to one embodiment of the invention, there is provided a gypsum slurry composition including a lignosulfonate salt, or lignin salt, for reducing the water requirements of the gypsum slurry. Preferably, the lignosulfonate salt is aluminum lignosulfonate and/or a double lignosulfonate salt, such as calcium aluminum lignosulfonate. Calcium aluminum lignosulfonate, described in greater detail below, is preferably produced by reacting or contacting calcium lignosulfonate with an aluminum salt, such as aluminum sulfate. Preferably, the calcium aluminum lignosulfonate is included at about 1 pound to about 3 pounds (about 453.6 grams to about 1360.8 grams), and more preferably about 1 pound to about 2 pounds (about 453.6 grams to about 907.2 grams) per 1400 pounds (about 635.6 kg) of stucco.

The invention is also directed to a two-component water reducing system. The two-component system may be prepared by combining a lignosulfonate and an aluminum salt. Suitable lignosulfonates include, for example, calcium aluminum lignosulfonate, calcium lignosulfonate, and aluminum lignosulfonate. Aluminum sulfate is the preferred aluminum salt. The two-component system can be produced by combining aqueous solutions of these ingredients.

The two-component system may further include a salt of polyacrylic acid, preferably sodium polyacrylate. Thus, the invention also provides a three-component property-enhancing system. The salt of polyacrylic acid, e.g., sodium polyacrylate, preferably has a molecular weight in a range of about 1200 to about 7000, as described in greater detail below.

In an alternative embodiment of the invention, there is provided a composition including (1) a lignosulfonate, such as aluminum lignosulfonate or a double lignosulfonate salt (e.g., calcium aluminum lignosulfonate) and (2) a salt of polyacrylic acid. The salt of polyacrylic acid in this embodiment is also preferably sodium polyacrylate having a molecular weight in a range of about 1200 to about 7000.

A preferred composition according to the invention may be produced by combining (1) a lignosulfonate (preferably a calcium salt or calcium aluminum double salt of a lignosulfonate, e.g., calcium lignosulfonate); (2) a polyacrylate salt; and (3) an aluminum salt (e.g., aluminum sulfate).

A preferred water reducing agent of the invention may be produced by combining the ingredients set forth in Table I below. (The ranges are based upon total weight of active and inactive ingredients.) Preferably, the lignosulfonates and polyacrylate are about 50% solids, while the aluminum sulfate is about 47%. Table II provides preferred ranges based on active ingredients.

TABLE I

| Component | Range Parts by Weight | Preferred Parts by Weight | Example |
|---|---|---|---|
| calcium ligno-sulfonate | about 50 to about 98 | about 96 to about 98 | 96.4 |
| sodium polyacrylate | about 2 to about 25 | about 2 to about 4 | 3.25 |
| aluminum sulfate ("paper makers alum") | about 0.5 to about 5 | about 1 to about 2 | 1.76 |

TABLE II

| Component | Range Based on Active Ingredients | Preferred Active Parts by Weight | Example |
|---|---|---|---|
| calcium ligno-sulfonate | about 25 to about 50 | about 48 to about 49 | 48.2 |
| sodium polyacrylate | about 1 to about 13.5 | about 1 to about 2.5 | 1.6 |
| aluminum sulfate ("paper makers alum") | about .2 to about 2.5 | about .25 to about 1 | 0.8 |

When utilized in a wallboard core mix, preferably between about 1 pound and about 5 pounds, and more preferably about 3 pounds and about 4 pounds of the system of Table I (preferably between about 0.5 pound and about 3 pounds, and more preferably about 1.5 pounds to about 2 pounds of the active ingredients shown in Table III) are used per about 1400 pounds of gypsum to produce about 1000 square feet of board.

Although the invention is not to be limited by any particular mechanism or theory, it is believed that combining a lignosulfonate (e.g., calcium lignosulfonate) and aluminum sulfate will produce a double salt such as calcium aluminum lignosulfonate and/or aluminum lignosulfonate. As described herein, the double salt and the aluminum salt do not suffer from the set retarding effects produced by known water reducing agents.

The compositions of the invention may reduce the water requirement for producing the fluidized gypsum slurry, provide improved rheological properties, and provide improved properties in final products such as wallboard.

With respect to reducing water requirements of the gypsum slurry, adhesion between particles of stucco is a factor in determining the amount of water required to produce a slurry with sufficient fluidity that it can be satisfactorily poured onto cover sheets. As described above, as much as 70 to 80 milliliters or more of water per 100 grams of gypsum are typically required in order to sufficiently fluidize the gypsum slurry, whereas only about 18.4 to about 18.8 milliliters of water per 100 grams of gypsum are actually required to complete the hydration reaction.

It has been found that the compositions and methods of the invention allow for the use of reduced levels of water in the gypsum wallboard slurry. The compositions of the invention plasticize the gypsum slurry, reducing the water requirement. By including an aluminum lignosulfonate with the gypsum slurry, a reduction in the water-to-stucco ratios of preferably about 5 to about 15 percent, and more preferably about 20 to about 25 percent, is preferably effected without a change in the "slump," or fluidity of the slurry. Thus, the water-to-stucco weight ratio can be reduced from about 0.9 to a ratio in a preferred range of about 0.6 to about 0.9, and more preferably in a range of about 0.65 to about 0.72, for example, 0.71.

In permitting reduced levels of water in the gypsum slurry, the invention allows for significant energy conservation, including in the reduction of fuel used in drying the gypsum board.

The compositions of the invention also assist the formation of a smooth, uniform stucco/water core composition, and therefore counteract the formation of bubbles and any segregation of water on the surface of the composition laid on the wallboard cover paper, thereby providing improved properties in the final product.

Moreover, the compositions of the invention have other beneficial effects on stucco hydration. For example, the compositions of the invention preferably increase the induction period of setting calcium sulfate hemihydrate. The induction period is the period when calcium sulfate hemihydrate is mixed with water; there is initially very little reaction and generally no increase in temperature of the slurry. An increased induction period is beneficial because this itself will improve the mixing and wetting characteristics of stucco.

The compositions of the invention reduce stucco breakdown typically experienced during high shear mixing because of high charge density polyelectrolyte. The particle-to-particle attraction force is reduced and results in a consistent, uniform gypsum slurry in the presence of other additives such as starch, vermiculite, fiberglass, catalyst, and preservatives.

In addition, the invention preferably shortens the set time of the gypsum slurry, i.e., the time between the "initial set" and the "final set" of the composition. For example, the compositions of the invention which incorporate a metallic salt such as aluminum sulfate preferably will be accelerated in the final set time by increasing the rate of hydration of the gypsum, thereby improving the properties of the final product.

It has still further been found that the compositions of the invention provide surprising improvements in other properties of the final product, such as providing increased strength and improved paper-core interface bonding characteristics of the gypsum wallboard. The final products have improved nail pull values and compressive strengths.

The above-described properties have all been exhibited without the negative effects of prior water reducing agents, particularly the retarding effect of agents incorporating sodium, calcium, or ammonium salts of lignosulfonic acid.

Solid particles suspended in an aqueous system normally carry a charge. The magnitude and the sign of the charge will depend on the chemistry of the solid surface and on the solution surrounding the particles, i.e., on the electric double layer at the solid-liquid interface. The distribution of the charge that occurs at the double layer may be due to a number of the following phenomena: (1) an unequal dissolution of oppositely charged ions of which particle is composed ($Ca^{++}$ and $SO_4^{--}$ in case of gypsum); (2) the preferential adsorption of one of the ions in the solution (e.g., either $Ca^{++}$ of $SO_4^{--}$ in $CaSO_4$ or ions of added salts); and (3) the orientation of dipolar molecules at the liquid-solid interface.

The general mechanism by which lignosulfonate functions is also believed to be electrochemical in nature. Ions are adsorbed onto the surfaces of suspended particles which thereby become negatively charged. The resulting electrostatic repulsive forces are strong enough to keep at least some of the particles separate, preventing agglomeration.

Although the invention is not to be limited by any particular mechanism or theory, it is believed that the calcium aluminum lignosulfonate provides a better mechanism of action than prior agents. For example, calcium lignosulfonate adsorbed on the stucco particles during hydration occupies interlayer positions in the crystal, which modifies the "crystal habit" of the structure and has relatively high shrinkage. Aluminum lignosulfonate, conversely, is able to act as an accelerator (the log pKa value of the aluminum cation (18) being greater than that of the calcium cation (10.4)). The adsorption of the calcium aluminum lignosulfonate on the gypsum particles results in a surface charge and zeta potential of the solid particles. Charges of the same sign cause repulsion forces which favor the solid dispersion and therefore increase the mix plasticity.

When the dissociation of surface groups of the inventive additives followed by adsorption of the solid phase when an electric field or mechanical action is applied to such system, a tangential motion between charged phase can result in various electro-kinetic effects: (a) Electrophoresis—Dispersed particles move through the solution on application of an electric field; and (b) Electro Osmosis—The liquid moves under the influence of the field and the solid phase remains stationary. The electro-kinetic effect is then associated with a potential. The Zeta ($\zeta$) potential, defined as "the electric potential at the surface of shear between the two phases in relative motion." The surface of the particle immobilizes a certain amount of the solvent which then contributes to the Zeta potential of the system.

The ingredients of a preferred wallboard core composition of the invention will now be described in more detail. The first ingredient of the wallboard core composition of the invention is calcium sulfate hemihydrate, or stucco ($CaSO_4 \cdot \frac{1}{2}H_2O$). The gypsum slurry preferably includes about 40 weight percent or greater calcium sulfate hemihydrate, and more preferably about 48 or greater weight percent calcium sulfate hemihydrate. Preferably, the $\alpha$-hemihydrate form of calcium sulfate hemihydrate is used with the invention.

The calcium sulfate hemihydrate can be produced by a dry calcination method, such as kettle, calcidyne, holoflyte, rotary kiln, impmill, or caludis peter calcination. Dry calcined stucco has a higher surface area than that produced by autoclave calcination (steam calcination). Calcium sulfates produced by dry calcination methods have high surface energy, so they are generally more reactive than those produced by autoclave calcination. Because of high surface area, these stuccos require four to five times more water to produce a fluid slurry.

Calcium sulfate is described in the Kirk-Othmer Encyclopedia of Chemical Technology, Vol. 4, pages 812–26 (Fourth Edition 1992), the disclosure of which is hereby incorporated herein by reference.

Other dry ingredients may be included in the core composition, including an accelerator which can be used to control, within certain limits, the crystal growth rate and set time of the stucco. Examples of suitable accelerators include ball mill accelerators ("BMA") and potassium sulfate, although others are known to those of skill in the art.

An aqueous slurry or solution of paper pulp is also preferably included in the core composition. The pulp solution comprises water and paper fibers ("paper pulp"), and may also include corn starch and/or potash.

A retarder optionally may be included in the paper pulp solution and is used in conjunction with the aforementioned accelerator in order to tailor the set time of the core composition. Retarding agents are typically used in with the invention at very low rates, for example at about 0.0007 weight percent, based on the weight of the core composition.

One of the above-described property-enhancing compositions should also be included. For example, one such composition may be produced by combining about 50 to about 98 parts by weight of a calcium lignosulfonate, about 2 to about 25 parts by weight of a polyacrylate, and about 0.5 to about 5 parts by weight of a metallic salt providing acidic aluminum cations. This mixture preferably forms a composition including calcium aluminum lignosulfonate and/or aluminum lignosulfonate. Preferably, the final lignosulfonate component will consist essentially of, and may consist of, calcium aluminum lignosulfonate.

A lignosulfonate, or lignin sulfonate, is a water-soluble metallic sulfonate salt generally made from the lignin of sulfite pulp-mill liquors. Lignosulfonates are complex molecules typically having molecular weights in a range of about 1000 to about 20,000. Macromolecule units are arranged in branched polyaromatic chains. Negatively charged sulfonate groups near the surface of the molecule maintains solubility in water.

Lignin, in turn, is generally a phenolic polymer of amorphous structure naturally making up about 17 to about 30 weight percent of wood, and is generally recovered in limited amounts from wood-processing wastes. Lignin is described in the Kirk-Othmer Encyclopedia of Chemical Technology, Vol. 15, pages 268–87 (Fourth Edition 1995) and Vol. 23, pages 166–206 and 491–500 (Fourth Edition 1997) and Hawley's Condensed Chemical Dictionary, pp. 699–700 (Eleventh Edition 1987), the disclosures of which are hereby incorporated herein by reference.

As stated above, lignin is naturally occurring in wood. By cooking wood in a solution of calcium bisulfite and sulphur dioxide under heat and pressure, lignin is converted to the calcium salts of lignosulfonic acid. Cellulose remains practically unaltered and can be used in the manufacturing of paper and other cellulosic products. The "waste liquor" containing various products may then be subjected to different treatment steps to produce a range of lignosulfonates. The usual admixture formulations contain calcium or sodium salts of lignosulfonic acid. Certain lignosulfonate-based admixtures have been extensively used as water reducing agents for gypsum. Calcium lignosulfonate can be produced from soft wood or hard wood liquor.

The calcium aluminum lignosulfonate used with the invention is preferably of high molecular weight, for example in a range of about 25,000 to about 35,000. Byproduct calcium lignosulfonate suitable for use with the invention (e.g., in combination with aluminum sulfate) may be obtained from various commercial sources. Preferably, the lignosulfonate salt contains minimal amounts of wood sugars.

In another alternative embodiment of the invention, triethanolamine may be combined with urea to produce a fluidity-enhancing agent.

A suitable polyacrylate for the invention is sold under the trade name Colloid 231 by Rhône-Poulenc Inc. of Danbury, Conn., the product data bulletin and material data safety sheets of which are hereby incorporated herein by reference. Colloid 231 has a molecular weight of about 4300 and a specific gravity of about 1.3 at 25° C. Other polyacrylates are sold under the trade names RA-77 and Colloid 230 by Rhône-Poulenc Inc. Other copolymer solutions include Colloid 211 and Colloid 107 sold by Rhône-Poulenc Inc., as well as Acumer 9141 sold by Rhome & Haas Co. of Philadelphia, Pa. The polyacrylate preferably has a molecular weight in a range of about 1200 to about 7000, more preferably in a range of about 1700 to about 6500, for example in a range of about 2300 to about 2700. The polyacrylate (e.g., sodium polyacrylate) increases the induction period during the stucco hydration reaction.

Another ingredient of the inventive composition may be a suitable metallic salt that provides aluminum cations. Aluminum sulfate, $Al_2(SO_4)_3$, for example in an aqueous solution having a concentration of about 1 to about 47 weight percent, is a preferred ingredient. Aluminum sulfate can beneficially modify the crystal morphology, or crystal habit, of the setting gypsum, so the structure of the resulting set gypsum is improved. Addition of an aluminum sulfate increases the rate of setting of the gypsum and increases strength development.

Particularly useful ingredients for commercial scale production include the following: (1) aluminum sulfate solution supplied by Delta Industries Incorporated of Choctaw, Okla., the manufacturer's safety data sheet of which is hereby incorporated herein by reference; (2) aluminum sulfate (also referred to as "paper maker's alum," "liquid alum," or aluminum sulfate liquid), supplied for example, by Peridot Chemicals Inc. of Wayne, N.J.; Cytec Industries Inc. of West Patterson, N.J.; or Industrial Chemical of Armonk, N.Y.; and (3) aluminum potassium sulfate which is a double salt supplied, for example, by the Holland Chemical Company of Adams, Mass. A discussion of aluminum sulfate is also provided in the aforementioned U.S. Pat. No. 5,653,797, previously incorporated herein by reference. The use of aluminum sulfate is also advantageous, for example, because it is believed to bind calcium ions present in the supplied calcium lignosulfonate, thereby allowing use of calcium lignosulfonate. It is believed that for some applications ferric sulfate and/or copper sulfate may be used in place of aluminum sulfate.

The above-described mixture of the invention may be included with the paper pulp solution or added directly to the mixing operation separately from the paper pulp solution.

The wet portion of the core composition also preferably includes a component that incorporates a foam. Foam introduces air voids into the core through the use of a foam that contains very little solid material, but is resilient enough to resist substantial breakdown in the mixing operation. In this manner, the density of the core can be controlled. Known foaming agents may be supplied in either liquid or flake (powdered) form, and may be produced from soaps known in the art.

An antidessicant such as starch is also included in order to prevent the dehydration of calcium sulfate dihydrate crystals formed during setting of the core composition. In some products, lightweight aggregates (e.g., expanded perlite or vermiculite) can be included. Additional accelerators can be included. Suitable accelerators include metallic salts that provide acidic cations, such as aluminum sulfate, potassium sulfate, calcium sulfate, ferric sulfate, and ferric chloride. Suitable accelerators, in either powder or liquid form, include ferrous sulfate and ferric chloride supplied, for example by the J.T. Baker Chemical Company of Philadelphia, N.J.

Gypsum wallboard can be adapted for wet and exterior applications, in addition to use in constructing interior walls and ceilings. In the production of exterior sheathing and moisture-resistant board cores, various materials can be incorporated into the core to impart increased water absorption resistance to the board. Useful materials include silicone water repellents, waxes, and asphalt emulsions. These materials are typically supplied as water emulsions to facilitate ease of incorporation into the board core. These materials can be added directly into the mixing apparatus or incorporated into the pulp solution prior to addition to the mixing apparatus.

It should be noted that the invention is not limited to the order and manner of mixing of ingredients described above. For example, where the three-component property-enhancing composition is desired, the salt of polyacrylic acid is optionally, but need not be, pre-blended with the other two components.

General ranges of ingredients used in the wallboard are shown in Table III below, along with two sample formulae.

TABLE III

| Ingredient | Exemplary Range | Sample Formula | Sample Formula |
| --- | --- | --- | --- |
| stucco | about 48–55 wt. % | 870 g | 696 g |
| accelerator | about 0.04–0.25 wt. % | 1.0 g | 1.8 g |
| starch | about 0.12–0.32 wt. % | 4.0 g | 4.0 g |
| retarder | about 0–0.2 wt. % | 0 g | 0 g |
| paper pulp | about 0.06–0. wt. % | 2.00 g | 1.6 g |
| pulp water | about 36–44 wt. % | 670 g | 524 g |
| foam solution | about 4–12 wt. | 156.3 g | 136.7 g |
| calcium lignosulfonate | about .004–.008 wt. % | 1.5 g | 1.8 g |
| aluminum sulfate | about .0001–.0002 wt. % | .06 g | .12 g |
| sodium polyacrylate | about .0001–.00005 wt. % | .12 g | .24 g |

A preferred method process for manufacturing the core composition and wallboard of the invention initially includes the premixing of dry ingredients in a mixing apparatus. The dry ingredients preferably include calcium sulfate hemihydrate (stucco), an optional accelerator, and an antidesiccant (e.g., starch), as described below in greater detail. The dry ingredients are preferably mixed together with a "wet" (aqueous) portion of the core composition in a pin mixer apparatus.

The wet portion can include a first component (referred to as a "paper pulp solution") that includes a mixture of water, paper pulp, and a fluidity-increasing agent of the invention. A set retarder can be included. The paper pulp solution provides a major portion of the water that forms the gypsum slurry of the core composition. The water supplied in the wet portion of the composition should include sufficient water for the setting reaction of the gypsum, plus an additional amount to decrease the consistency of the slurry during the manufacturing process. A second wet component may include a mixture of foam and other conventional additives, if desired, foam, starch, surfactants, and glass fiber.

The pulp solution can be prepared by blending or mixing the above ingredients with water in a blending apparatus. Alternatively, a concentrated pulp solution using only a small volume of water can be produced. In this case, the remainder of the core mix water requirement is made up with a separate water source. Typically, about 60 to about 72 weight parts water are used per 100 weight parts stucco. Preferably, high shear mixing "pulps" the material, forming a homogenous solution or slurry. The pulp solution can be transferred to a holding vessel, from which it can be continuously added to the core composition mix. The paper fibers in the pulp solution serve to enhance the flexibility of the gypsum wallboard.

The produced core composition slurry is deposited between paper cover sheets to form a sandwich. The core composition is allowed to cure or set, whereby calcium sulfate hemihydrate is converted to calcium sulfate dihydrate. The product is then preferably dried by exposing the product to heat, in order to remove excess water not consumed in the reaction forming the calcium sulfate dihydrate.

The setting reaction produces gypsum crystals, which are interwoven to contribute strength to the wallboard core. The crystal-to-crystal interaction is important to the final strength of the gypsum wallboard product. The gypsum crystals also preferably interlock with paper fibers protruding from the surface or cover papers, thus bonding the papers to the core. This bonding or interaction also increases the strength of the wallboard product.

The alteration of the water to stucco ratio may have several effects on the wallboard composition. First, a low water to stucco ratio will generally decrease the porosity of the final board product, as the water present in the slurry will generally increase porosity in the final product. The lower water usage will increase the effect of the crystal growth during setting because available nucleating sites are concentrated into a smaller volume of the mix. Interaction of growing gypsum crystals occurs earlier and is more effective, and is therefore believed to provide improved strength in the final products of the invention.

Moreover, in general strength properties are also increased by using less water to fluidize the gypsum slurry. The reduced drying requirement also provides the potential to increase line speed, providing a large commercial advantage of the invention.

In order to demonstrate the advantageous results of the invention, comparative testing has been performed.

EXPERIMENT I

A first experiment was performed in order to measure the fluidity of various samples. For each sample, 200 grams of stucco were mixed with about 180 grams of water, 36 grams of which are required for hydration of the stucco, the excess being used to fluidize the stucco-water mix.

In Samples A-1 and B-1 of the invention, 0.15 grams of a calcium aluminum lignosulfonate (double salt) were included as a fluidity-enhancing agent. (In the experiments discussed herein, samples designated "A" utilized a hard wood lignosulfonate, while samples designated "B" utilized a soft wood lignosulfonate.) The utilized calcium aluminum lignosulfonate has about 50 percent solids, so the amount of active salt is about 0.075 grams for each sample. The control did not include any fluidity-enhancing agent. For each sample, the ingredients were allowed to stand for approximately 30 seconds, followed by mixing for approximately 30 seconds.

The samples were poured into a funnel the bottom of which was disposed at an elevation of about three and one-half inches over the surface of a glass plate. After the material passed through the funnel and dropped onto the glass plate, the diameter of the resulting mass was measured. This test, referred to as a "slump test," provides an indication of the fluidity of the sample.

The "initial" and "final" set times of the samples were also measured in minutes, as measured by the ¼ lb. and 1 lb. Gillmore Needle Test (ASTM C266), respectively. The initial set time is the point at which hydration reaction (setting) begins, while the final set time is the point at which the hydration reaction is completed.

The results are shown below in Table IV. ("CA Lig." refers to the amount of active calcium aluminum lignosulfonate added to the slurry.)

TABLE IV

| Sample | CA Lig. | Diameter | Initial Set Time | Final Set Time |
| --- | --- | --- | --- | --- |
| Control-1 | 0 g | 7.25 in. (18.4 cm) | 5 min. 32 sec. | 9 min. 35 sec. |
| Sample A-1 | 0.075 g | 9.25 in. (23.5 cm) | 5 min. 15 sec. | 9 min. 3 sec. |
| Sample B-1 | 0.075 g | 10.5 in. (26.7 cm) | 5 min. 3 sec. | 9 min. 15 sec. |

The results from Experiment I show that the samples of the invention provide substantially greater diameters in the slump test, reflecting greater fluidity than the control sample.

EXPERIMENT II

In a second experiment, for each of six samples (Control-2, Sample A-2, Sample B-2, Control-3, Sample A-3, and Sample B-3), 870 grams of stucco were mixed with (a) 20 mL water of hydration per 100 grams stucco plus (b) 72 mL water per 100 grams stucco to increase consistency. Also added to Sample A-2 and Sample B-2 were 0.15 gram calcium aluminum lignosulfonate (providing about 0.075 g active lignosulfonate). Samples A-3 and B-3 still further included 0.26 grams of 50 percent solids sodium polyacrylate.

The mixture were allowed to stand for about 1 minute, followed by mixing for about 30 seconds. The "slump" measurement and "initial" and "final" set times described in Example I above were also determined. The results of Experiment II are shown below in Table V.

TABLE V

| Sample | Slump | Initial Set Time | Final Set Time |
| --- | --- | --- | --- |
| Control-2 | 3.06 | 5 min. 32 sec. | 9 min. 35 sec. |
| Sample A-2 | 4.01 | 5 min. 15 sec. | 9 min. 1 sec. |
| Sample B-2 | 4.23 | 5 min. 3 sec. | 9 min. 15 sec. |
| Control-3 | 3.08 | 5 min. 4 sec. | 9 min. 35 sec. |
| Sample A-3 | 4.02 | 5 min. 16 sec. | 9 min. 18 sec. |
| Sample B-3 | 4.25 | 5 min. 33 sec. | 9 min. 17 sec. |

The results of Experiment II confirm that the compositions of the invention have enhanced fluidity over the control composition. In addition, it can be seen from Table V that the samples of the invention exhibited some acceleration of final set when compared to the controls.

EXPERIMENT III

In another experiment, various cubes made of a gypsum composition were prepared in order to examine the properties of the inventive composition.

For each of Control-4, Sample A-4, and Sample B-4, 400 grams of stucco were mixed with 288 grams water and 0.25 wt. percent dispersing agent based upon water (0.72 g) and an amount of consistency water shown in Table VI. The ingredients were allowed to stand for 1 minute, followed by mixing for 30 seconds.

The initial set time was measured as described above. Three two-inch by two-inch cubes were cast for each sample and allowed to complete a final set. The cubes were then dried at 110° F. for 48 hours or until the cubes showed constant weight. Cubes were then tested for compressive strength by removing them from their molds and placing them in a commercially-available Instron apparatus typically used in the industry for compression testing. The apparatus slowly increases the load placed on each cube until the cube fails (ruptures), at which time the load is automatically recorded by the apparatus. The range of values obtained for the three cubes is recorded with the other data in Table VI below.

TABLE VI

| Sample | CA Lig. | Consistency Water | Initial Set Time | Range of Dry Strength (PSI) |
|---|---|---|---|---|
| Control-4 | 0 g | 72 mL | 5.3 min. | 1754–1759 |
| Sample A-4 | 0.72 g | 68 mL | 5.21 | 1820–1824 |
| Sample B-4 | 0.72 g | 65 mL | 515 | 1928–1930 |

The results of Experiment III demonstrate that the invention allows for reduced levels of consistency water, while providing products that have substantially improved dry strengths as measured by standard testing, when compared to the control.

EXPERIMENT IV

In yet another experiment, various cubes made of a standard wallboard core composition were prepared in order to examine the properties of the inventive composition.

For each of three samples (Control-5, Sample A-5, and Sample B-5), a wallboard core composition was made according to the formulation shown in Table VII below, with the exception that the control sample did not include the final two ingredients (sodium polyacrylate and calcium aluminum lignosulfonate).

TABLE VII

| Ingredient | Amount |
|---|---|
| Stucco (calcium sulfate hemihydrate) | 870 g |
| Starch | 4.2 g |
| Ball mill accelerator (BMA) | 1 g |
| Paper pulp | 2 g |
| Foaming agent | 4 mL |
| Foam water | 165 mL |
| Sodium polyacrylate (50% solids) | 0.06 g |
| Calcium aluminum lignosulfonate (50% solids) | 0.15 g |
| Water | 690 mL |

The formulations were prepared by initially placing the stucco in a Hobart mixer, and adding the ball mill accelerator and about 690 mL of water. The mixture is allowed to stand for 10 seconds, followed by mixing for 10 seconds. A foam solution was prepared separately by adding the foaming agent and about 165 mL water into a commercially-available Hamilton Beach blender, and mixing until the volume reached about 650 mL. The foam solution is added to the Hobart mixer with the other ingredients and mixed at high speed for 10 seconds. The composition is poured into two-inch cube molds, allowed to come to final set, and dried at 110° F. for 48 hours or until the cubes showed constant weight. Three cubes were prepared for each sample.

The density and dry weight were measured for each cube. The cubes were then tested for compressive strength by removing them from their molds and placing them in the Instron apparatus. The range of values obtained for the three cubes is recorded with the other data in Table VIII below.

TABLE VIII

| Sample | Density (lbs./ft.$^3$) | Average | Core Strength (PSI) | Average | Cube Weight (Grams) | Average |
|---|---|---|---|---|---|---|
| Control-5 | 41.4 | | 439.4 | | 87.1 | |
|  | 41.4 | 41.4 | 439.2 | 439.6 | 87.1 | 87.1 |
|  | 41.4 | | 440.1 | | 87.1 | |
| Sample A-5 | 42.2 | | 490 | | 89.2 | |
|  | 42.4 | 42.3 | 495 | 492.3 | 89.24 | 89.2 |
|  | 42.4 | | 492 | | 89.15 | |
| Sample B-5 | 43.4 | | 510 | | 90.1 | |
|  | 43.4 | 43.4 | 512 | 510.7 | 90.2 | 90.2 |
|  | 43.35 | | 510 | | 90.2 | |

The data demonstrate that the invention is able to produce a commercial wallboard composition having greater density and core strength than compositions lacking the inventive treatment. The inventive wallboard cores will preferably have improved strength at equal weights comparative to prior wallboard compositions.

The foregoing detailed description is given for clearness of understanding only, and no unnecessary limitations should be understood therefrom, as modifications within the scope of the invention will be apparent to those skilled in the art. For example, the order in which the ingredients of the core composition are combined can be altered without negatively affecting the properties of the produced product, e.g., wallboard.

What is claimed is:

1. A composition suitable for use in the manufacture of construction materials, comprising:
    (a) calcium sulfate hemihydrate;
    (b) water; and
    (c) calcium aluminum lignosulfonate.

2. The composition of claim 1, further comprising a polyacrylate.

3. The composition of claim 2, wherein said polyacrylate has a molecular weight in a range of about 1200 to about 7000.

4. The composition of claim 2, further comprising starch, paper pulp, and a foam.

5. The composition of claim 1, wherein said composition comprises about 0.004 weight percent to about 0.008 weight percent calcium aluminum lignosulfonate.

6. The composition of claim 1, wherein said composition comprises about 60 parts to about 90 parts water per 100 parts calcium sulfate hemihydrate.

7. The composition of claim 1, wherein said composition is essentially free of lignosulfonate salts selected from the group consisting of calcium, ammonium, sodium, and naphthalene lignosulfonates.

8. The composition of claim 1, wherein said composition has a final set time of about 10 minutes or less, as measured by the Gillmore Needle Test.

9. A method of producing a composition suitable for use in the manufacture of construction materials, comprising the steps of:
    (a) forming a slurry comprising water and calcium sulfate hemihydrate;
    (b) combining calcium lignosulfonate with an aluminum salt, to form a property-enhancing component;

(c) providing the product of step (b) to said slurry of step (a);

(d) mixing said slurry.

10. The method of claim 9, wherein said aluminum salt is aluminum sulfate.

11. The method of claim 10, wherein step (b) further comprises combining a polyacrylate with said calcium lignosulfonate and said aluminum salt.

12. The method of claim 11, wherein step (b) comprises combining about 25 to about 49 parts by weight calcium lignosulfonate, about 0.2 to about 2.5 parts by weight aluminum sulfate, and about 1 to about 13.5 parts by weight polyacrylate.

13. The method of claim 11, wherein said polyacrylate has a molecular weight in a range of about 1200 to about 7000.

14. The method of claim 12, wherein said polyacrylate has a molecular weight in a range of about 2300 to about 2700.

15. The method of claim 10, wherein said step (b) comprises forming calcium aluminum lignosulfonate.

16. The method of claim 10, wherein step (a) comprises providing about 60 parts to about 90 parts water per 100 weight parts calcium sulfate hemihydrate.

17. The method of claim 10, wherein step (a) comprises providing about 65 parts to about 72 parts water per 100 weight parts calcium sulfate hemihydrate.

18. A wallboard panel, comprising:

(a) a first cover sheet and a second cover sheet and (b) a core disposed between said cover sheets, said core comprising calcium sulfate dihydrate and calcium aluminum lignosulfonate.

19. A method of producing wallboard, comprising the steps of:

(a) forming a slurry comprising water, calcium sulfate hemihydrate, and aluminum lignosulfonate;

(b) mixing said slurry; and (c) depositing said slurry on a cover sheet.

20. A composition suitable for use in the manufacture of construction materials, comprising:

(a) calcium sulfate hemihydrate;

(b) water; and (c) an aluminum salt of lignosulfonate.

* * * * *